(12) United States Patent
Letourneur et al.

(10) Patent No.: US 10,140,957 B1
(45) Date of Patent: Nov. 27, 2018

(54) CONTROLLING CONTENT OUTPUT FEATURES TO OPTIMIZE CONTENT CONSUMPTION

(71) Applicant: Amazon Technologies, Inc., Seattle, WA (US)

(72) Inventors: Herve Jacques Clement Letourneur, San Francisco, CA (US); Kathryn Ann Chinn, San Francisco, CA (US); Elaine Yuan, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/195,518

(22) Filed: Jun. 28, 2016

(51) Int. Cl.
| | |
|---|---|
| *G09G 5/30* | (2006.01) |
| *G09G 5/26* | (2006.01) |
| *G11B 27/00* | (2006.01) |
| *G06F 3/01* | (2006.01) |
| *G06F 3/048* | (2013.01) |
| *G06F 17/21* | (2006.01) |
| *G06F 3/0483* | (2013.01) |
| *G06F 3/16* | (2006.01) |

(52) U.S. Cl.
CPC .............. *G09G 5/30* (2013.01); *G06F 3/013* (2013.01); *G06F 3/0483* (2013.01); *G06F 3/165* (2013.01); *G06F 17/212* (2013.01); *G06F 17/214* (2013.01); *G09G 5/26* (2013.01); *G11B 27/005* (2013.01); *G09G 2320/06* (2013.01); *G09G 2360/144* (2013.01)

(58) Field of Classification Search
CPC combination set(s) only.
See application file for complete search history.

(56) References Cited

U.S. PATENT DOCUMENTS

| | | | |
|---|---|---|---|
| 9,558,159 B1 * | 1/2017 | Thirupparangiri | ....... G09G 5/24 |
| 9,721,031 B1 * | 8/2017 | Marcum | ........... G06F 17/30884 |
| 2011/0117969 A1 * | 5/2011 | Hanson | ............. H04M 1/72552 |
| | | | 455/566 |
| 2012/0206472 A1 * | 8/2012 | Kandekar | .......... G06Q 30/0214 |
| | | | 345/581 |
| 2012/0256967 A1 * | 10/2012 | Baldwin | ................. G06F 3/013 |
| | | | 345/684 |
| 2013/0283145 A1 * | 10/2013 | Argent | .................. G06F 17/241 |
| | | | 715/231 |
| 2016/0179321 A1 * | 6/2016 | Crowther | .............. G06F 3/0485 |
| | | | 715/785 |

* cited by examiner

*Primary Examiner* — Wesner Sajous
(74) *Attorney, Agent, or Firm* — Lee & Hayes, PLLC

(57) ABSTRACT

A computing device may output content including text content, audio content, and video content according to one or more content output features. The content output features may include font features and page layout features for text content, volume and playback rate for audio content, and playback rate for video content. In some cases, a consumption rate of content by the individual may be determined to identify values of content output features that may increase consumption of content by the individual. The settings for the content output features may be modified to correspond with the values that provide increased consumption of content.

20 Claims, 7 Drawing Sheets

CONTROLLING CONTENT OUTPUT FEATURES TO OPTIMIZE CONTENT CONSUMPTION

BACKGROUND

Individuals access and consume content using computing devices. The content may include text content, image content, video content, audio content, or combinations thereof. The content may be output by a computing device using a number of content output features. In an example, text content may be output by a computing device having a font size, a font type, a display brightness, a layout of a page, or combinations thereof. Individuals may manually modify the content output features according to the preferences of the individuals. However, it may be difficult for individuals to manually determine optimal content output features for accessing and consuming content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
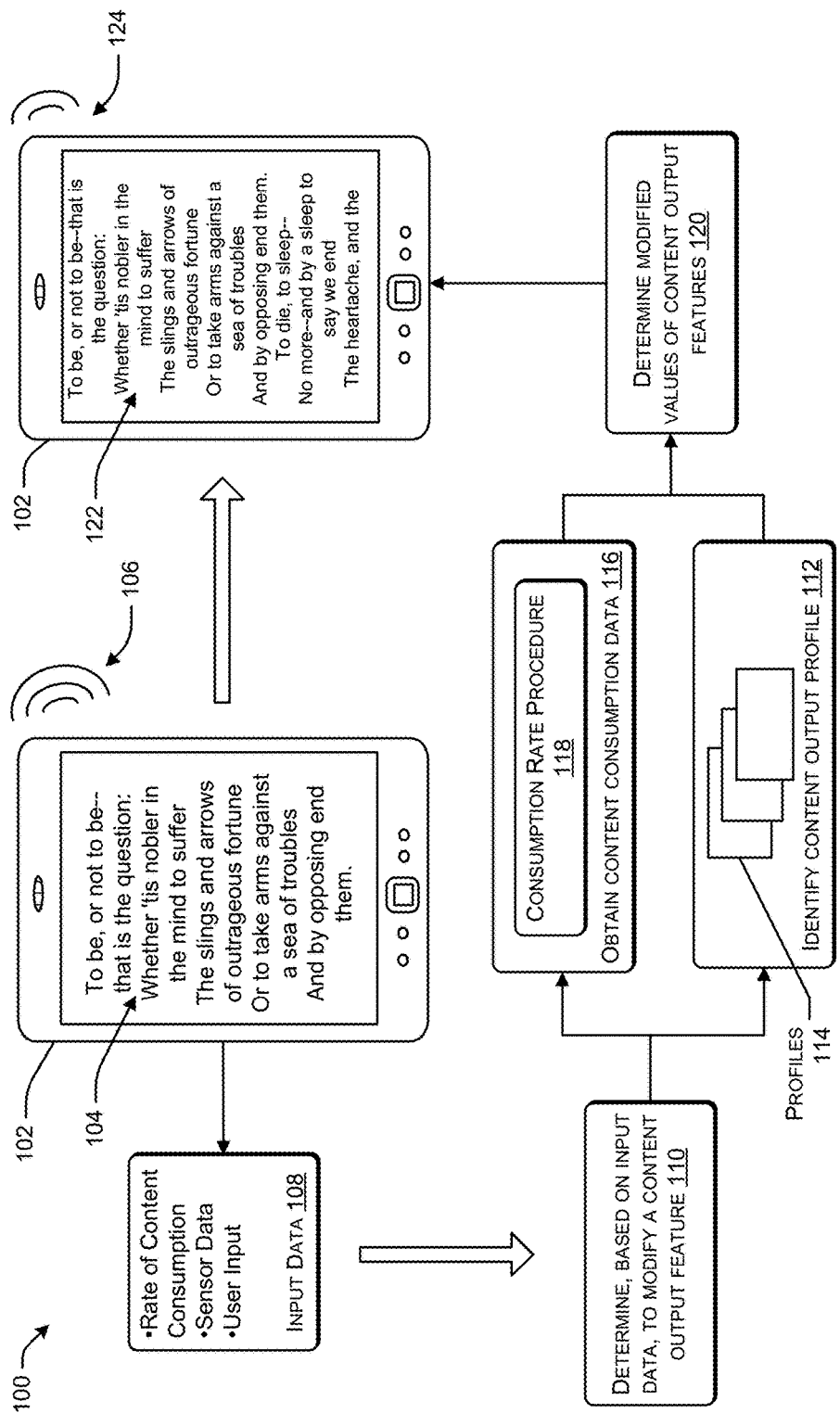
FIG. 1 illustrates an example system to modify content output features according to input data obtained by a computing device.

Described herein are systems and processes to identify content output features that may improve the consumption of content by individuals using computing devices. As used herein, the consumption of content may indicate an amount of content accessed by an individual using a computing device over a period of time. The consumption of content may also correspond with sensor data, such as gaze tracking data, that indicates content viewed by an individual over a period of time. In an illustrative example, the consumption of content may indicate a number of words of text content read by an individual. In another illustrative example, the consumption of content may indicate an amount of audio content provided to an individual. In an additional illustrative example, the consumption of content may indicate an amount of video content viewed by an individual.

In some implementations, a computing device may provide content to an individual according to one or more content output features. The content output features may correspond to the presentation of content by the computing device. For example, the content output features may include a font size of characters included in text content, a font type of characters included in text content, a layout of text content, or combinations thereof. Additionally, the content output features may include a brightness of a display of the computing device during the presentation of content. The content output features may also include a volume of audio content and a rate at which the audio content is output by the computing device. Further, the content output features may include a rate at which video content is output by the computing device.

In particular implementations, the computing device may determine that content output features are to be modified. In some instances, the computing device may receive express input from an individual to modify content output features. In other cases, the computing device may analyze input data to determine that content output features are to be modified. In an example, the computing device may determine that a triggering event has occurred and implement a procedure to modify the content output features of the computing device. To illustrate, the computing device may determine that consumption of content by an individual has decreased. In this situation, the computing device may implement a procedure to provide content using different content output features to identify settings for content output features that are associated with an increased reading speed of content. In an illustrative example, the computing device may provide text content having different font sizes and measure the consumption of the text content by the individual. By measuring the consumption of the text content by the individual for each of the font sizes, the computing device may determine an optimal font size that is associated with the highest rate of content consumption and modify the font size to correspond with the optimal font size. In this way, the amount of content consumed by an individual may increase. Additionally, the individual does not have to use trial and error to manually determine content output features that provide an optimal environment for content consumption by the individual.

FIG. 1 illustrates an example system 100 to modify content output features according to input data obtained by a computing device. The system 100 may include a computing device 102. The computing device 102 may include may include a laptop computing device, a tablet computing device, a mobile communications device (e.g., a mobile phone), a wearable computing device (e.g., watch, glasses, fitness tracking device), a desktop computing device, a gaming device, a television, combinations thereof, and the like. The computing device 102 may provide content that may be consumed by an individual using the computing device 102. Although not shown in the illustrative example of FIG. 1, the system 100 may include additional computing devices that perform one or more operations described herein with respect to FIG. 1.

In the illustrative example of FIG. 1, the content provided by the computing device 102 may include text content 104. The text content 104 may include words, characters, symbols, or combinations thereof. In addition, the text content 104 may be displayed with a font size, a font type, and/or a font style. For example, the text content 104 may be displayed using a 12 point Arial font. In addition, the text content 104 may be displayed using a particular layout for the text content 104. The layout of the text content 104 may include margins for the text content. The layout of the text content 104 may also include line spacing. The line spacing may indicate single spacing, 1.5 spacing, double spacing, or other line spacing values. The layout of the text content 104 may also include spacing between characters. Further, the layout of the text content 104 may include alignment of the text content. To illustrate, the alignment of the text content may include centered, left, right, justified, or a combination thereof.

In some implementations, the content provided by the computing device 102 may include audio content 106. The audio content 106 may be output by the computing device 102 at a rate, such as a number of words in a period of time. The audio content 106 may also be output by the computing device 102 at a volume. Additionally, the content provided by the computing device 102 may include video content and/or image content. The video content and the image content may be output using certain settings of a display of the computing device 102. For example, the display settings may include brightness, color, tint, sharpness, contrast, combinations thereof, and the like. Also, video content may be output by the computing device 102 at a given rate.

The computing device 102 may obtain input data 108. The input data 108 may include a rate of consumption of content that is provided by the computing device 102. The rate of consumption of text content may include a number of words per minute. In an illustrative example, the rate of consumption of text content may be determined according to a number of words or a number of characters displayed on a number of pages of the text content and an amount of time elapsed to display the pages of the text content. Additionally, the rate at which text content is consumed may be determined based at least partly on a number of page turns in a period of time and a number of words included on each of the turned pages. In another illustrative example, the rate of consumption of text content may be determined based at least partly on gaze tracking data indicating words of the text content viewed by an individual using the computing device 102.

The input data 108 may also include sensor data. The sensor data may include images obtained by one or more cameras. In particular implementations, the sensor data may include images obtained by a camera of the computing device 102. In other implementations, the sensor data may include images obtained from other cameras. In an illustrative example, the images included in the input data 108 may be images of one or more eyes of an individual using the computing device 102. The images of eyes of an individual may be used to determine words of text content that an individual using the computing device 102 is viewing. The images of eyes of an individual may also be used to determine when an individual is not viewing content provided via a display of the computing device 102. The images included in the input data 108 may also include gestures made by an individual using the computing device 102. Further, the images included in the input data 108 may indicate an environment of an individual using the computing device 108. The images included in the input data 108 may also indicate other characteristics of an individual using the computing device 102, such as facial expressions, the individual is wearing contact lenses, the individual is wearing glasses, or that the individual is not wearing a vision correction device. In some scenarios, the sensor data of the input data 108 may also include one or more sounds. For example, the input data 108 may indicate words spoken by an individual. The input data 108 may also indicate ambient noise of an environment that includes the computing device 102.

Additionally, the input data 108 may include user input. The user input may include input obtained with respect to one or more input devices of the computing device 102. For example, the user input may be obtained via a touchscreen of the computing device 102, via a microphone of the computing device 102, via a camera of the computing device 102, via one or more physical or virtual buttons of the computing device 102, or combinations thereof. In some cases, the user input may be related to one or more operations to be performed by the computing device 102.

In some cases, at least a portion of the input data 108 may be generated by the computing device 102. In other cases, at least a portion of the input data 108 may be obtained from a remote computing device. For example, the input data 108 may be obtained from another computing device included in an environment. To illustrate, the computing device 102 may obtain at least a portion of the input data 108 from a wearable computing device. In another illustration, the computing device 102 may obtain at least a portion of the input data 108 from a gaming device. In other situations, the computing device 102 may obtain the input data 108 from a remote computing device, such as a remote server.

At 110, the input data 108 may be used to determine that a content output feature is to be modified. For example, the input data 108 may indicate that a triggering event or condition has occurred, or is occurring, that indicates a content output feature is to be modified. In some implementations, the input data 108 may indicate an express request to modify a content output feature. To illustrate, the input data 108 may indicate a request to implement a procedure to determine content output features to increase consumption of content by an individual using the computing device 102. In an illustrative example, the input data 108 may indicate a request to initiate a procedure to modify content output features related to text content to increase a reading speed of an individual using the computing device 102. In another illustrative example, the input data 108 may indicate a request to initiate a procedure to modify content output features related to audio content to increase the rate at which audio content is consumed by an individual using the computing device 102. In an additional illustrative example, the input data 108 may indicate a request to initiate a procedure to modify content output features related to video content to increase the rate at which video content is consumed by an individual using the computing device 102. Further, the input data 108 may include an express indication that an environment in which the computing device 102 is located has changed and the change in environment may correspond with changes to content output features.

In other implementations, the computing device 102 or another computing device, may analyze the input data 108 to infer that a triggering event or condition has occurred, or is occurring, that indicates a content output feature is to be modified. For example, the input data 108 may be analyzed to determine a decrease in the rate at which content is being consumed by an individual using the computing device 102. To illustrate, the input data 108 may be analyzed to determined that a reading speed of an individual using the computing device 102 has decreased. In another example, the input data 108 may be analyzed to determine that an individual using the computing device 102 has changed from wearing contact lenses to wearing glasses. In an additional example, the input data 108 may be analyzed to determine an environment in which the computing device

102 is located. In an illustration, the input data 108 may be analyzed to determine that the computing device 102 is located in an environment that is darker than a previous environment.

In particular implementations, after determining that at least one content output feature is to be modified based at least partly on the input data 108, at 112, a content display profile may be identified. In some implementations, a content display profile may be selected from a plurality of content display profiles 114. A content display profile may be selected from the plurality of content display profiles 114 based at least partly on one or more conditions indicated by the input data 108 and one or more conditions associated with at least one of the content display profiles 114. For example, a first content display profile 114 may be associated with conditions corresponding to an individual using the computing device 102 wearing contact lenses and being outside. The first content display profile 114 may include settings for content output features that may have been previously determined to be optimal content output features for the given conditions associated with the first content display profile 114. In another example, a second content display profile 114 may be associated with conditions corresponding to an individual using the computing device 102 wearing glasses and being in an environment with dim lighting. The second content display profile 114 may be associated with additional conditions corresponding to an individual using the computing device 102 while wearing glasses and in a dim environment. In this situation, the second content display profile 114 may include settings for content output features that may have been previously determined to be optimal content output features for the given conditions associated with the second content display profile 114.

Further, after determining that at least one content output feature is to be modified based at least partly on the input data 108, at 116, content consumption data may be obtained. The content consumption data may indicate an amount of content consumed using the computing device 102. In some cases, the content consumption data may be obtained from the input data 108. For example, the input data 108 may include images of eyes of an individual using the computing device 102 as text content is read by the individual. The images may be used to determine a reading speed of the individual. The content consumption data may be associated with settings of content output features that were being implemented when the content consumption data was obtained. In another example, the input data 108 may include a number of page turns of text content and a reading speed of an individual using the computing device 102 may be determined based at least partly on the number of page turns during a period of time and a number of words included in the pages.

In various implementation, the computing device 102 may implement a consumption rate procedure 118 to determine the consumption rate of content for different settings of content output features. In particular implementations, the consumption rate procedure 118 may output content using the computing device 102 in accordance with a first group of settings for one or more content output features and determine the rate of consumption of content associated with the first group of settings. After a period of time, the computing device 102 may output content using the computing device 102 in accordance with a second group of settings for one or more content output features and determine an additional rate of consumption of content associated with the second group of settings. At least one of the content output features associated with the first group of settings and the second group of settings may have a value in the second group of settings different than a value in the first group of settings. In some cases, one or more of the values of the content output features may be the same in the first group of settings and the second groups of settings.

In an illustrative example, the consumption rate procedure 118 may include providing text content via the computing device 102 using a first group of content output features including a first font size, a first font type, and a first brightness of a display of the computing device 102 and determining an amount of the text content consumed over a period of time. The consumption rate procedure 118 may also include providing text content via the computing device 102 using a second group of content output settings including a second font size that is different from the first font size, the first font type, and the first brightness of the display and determining an additional amount of the text content consumed over a period of time. In some cases, the rate of consumption of the text content may change from the first group of content output settings to the second content output settings. The consumption rate procedure 118 may continue to provide text content via the computing device 102 in accordance with different groups of content output settings and determine the amount of consumption of the text content for the different groups of content output settings. In particular scenarios, the consumption rate procedure 118 may be implemented as a background procedure without expressly notifying an individual using the computing device 102. In other situations, the consumption rate procedure 118 may be conducted after informing an individual using the computing device 102 that the consumption rate procedure is being implemented. In various instances, the consumption rate procedure 118 may be implemented based at least partly on input from an individual using the computing device 102 to conduct the consumption rate procedure 118.

Additionally, the consumption rate procedure 118 may include associating other information with the amount of the text content consumed in accordance with the first group of content output features and the second group of content output features. For example, the amount of text content consumed in accordance with the first group of content output features and the second group of content output features may be associated with a condition that an individual using the computing device 102 is wearing contact lenses and the eyes of the individual are between 8 inches and 15 inches from the computing device 102. In this way, the consumption rate procedure 118 may generate one or more of the content display profiles 114 to be used at a subsequent time.

At 120, the system 100 may determine modified values of content output features. For example, a particular content display profile 114 may be identified that corresponds with one or more portions of the input data 108, and the value of one or more content output features may be modified to correspond with a respective value included in the particular content display profile 114 for the one or more content output features. To illustrate, the input data 108 may indicate that an individual using the computing device 102 has removed their glasses and put on contact lenses. A content display profile 114 may include values for content output features that correspond with the situation where the individual is wearing contact lenses. In this situation, the system 100 may identify values of one or more of the content output features associated with the content display profile 114 corresponding to the situation where the individual is wearing contact lenses. In an illustrative example, a content display profile 114 may indicate that the font size of text content provided via the computing device 102 may be different when the individual is wearing contact lenses with respect to the font size of the text content when the individual is wearing glasses.

In another example, the system 100 may implement the consumption rate procedure 118 to identify values of content output features that correspond with increased rates of consumption of content using the computing device 102. In these situations, the values of content output features may be modified to correspond with the values of the content output features determined using the consumption rate procedure 118. In an illustrative example, the input data 108 may indicate that a reading speed of text content for an individual using the computing device 102 decreased with respect to a first group of values of output features. Continuing with this example, the consumption rate procedure 118 may determine a second group of values of the content output features that are associated with an increased reading speed of text content for the individual. In particular illustrative implementations, the consumption rate procedure 118 may determine that a font size of the text content is to be modified to increase the reading speed of the individual.

After determining the modified values of one or more content output features, the computing device 102 may change the values of the one or more content output feature to the modified values. For example, the system 100 may determine that a font size of text content displayed via the computing device 102 is to be modified from 12 point to 10 point. Accordingly, the computing device 102 may modify the text content 104 to produce the text content 122 that has a 10-point font size. In another example, the system 100 may determine that a volume associated with audio content output by the computing device 102 is to be decreased. The computing device 102 may then modify the audio content 106 to produce the audio content 124 that has a lower volume than the audio content 106.

Although the illustrative example of FIG. 1 shows the font of the text content 104 changing to the text content 122 having a different font size and the audio content 106 changing to audio content 124 having a different volume, the operations used to produce the changes in the text content 104 and the audio content 106 may be implemented multiple times. In some cases, modified values of the content output features may be changed back to original values for the content output features. For example, based on additional input data, the font of the text content 122 may be changed back to the font of the text content 104. In other situations, the modified values of content output features may be changed to additional values. To illustrate, based on additional input data, the font size of the text content 122 may be changed to a font size larger than the font size of the text content 104 or to a font size smaller than the font size of the text content 122. In this way, the content output features may be updated periodically as input data obtained by the computing device 102 indicates that changes to content output features are to be implemented.

Figure 2:
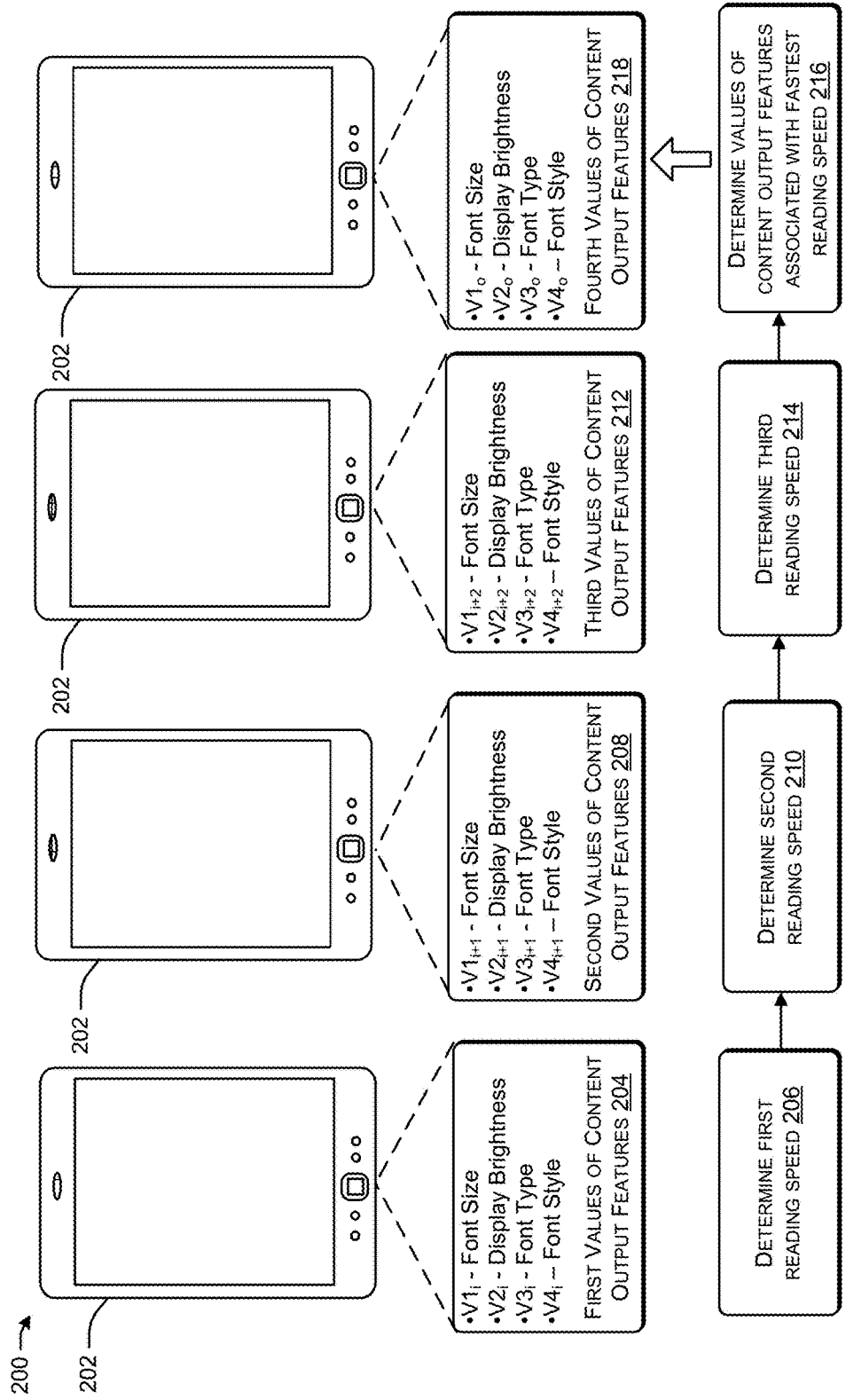
FIG. 2 illustrates an example framework that identifies values of content output features that provide increased consumption of content by an individual.

FIG. 2 illustrates an example framework 200 that identifies values of content output features that provide increased consumption of content by an individual. The framework 200 includes a computing device 202. In the illustrative example of FIG. 2, the computing device 202 may output text content and the framework 200 may relate to identifying optimal values of content output features corresponding to displaying text content. For example, the content output features may include font size, display brightness, font type, and font style. The font size may include values such as 5 point, 6 point, 7 point, 8 point, 10 point, 11 point, 12 point, 14 point, 16 point, and so forth. The display brightness may include values on a scale of 1 to 10, values on a scale of 1 to 100, values on a scale of 1 to 1000, and the like, where lower values on the scale are associated with less brightness of the display and higher values on the scale are associated with a greater amount of brightness. The font type may include Bookerly, Arial, Helvetica, Palatino, Baskerville, Georgia, Caeclia, Times New Roman, and the like. Additionally, the font style may include bold, italics, or regular. Although the illustrative example of FIG. 2 includes four content output features for text content, other content output features may also be optimized. To illustrate, the content output features may also include features related to the layout of text content on a page. In some implementations, the content output features may also include margins, paragraph spacing, line spacing, character spacing, text alignment, combinations thereof, and so forth.

The computing device 202 may implement first values of content output features 204. The first values of content output features 204 may include a value $V1_i$ for font size, a value $V2_i$ for display brightness, a value $V3_i$ for font type, and a value $V4_i$ for font style. In particular implementations, the computing device 202 may display the text content using the values $V1_i$, $V2_i$, $V3_i$, and $V4_i$. In some cases, the computing device 202 may display text content according to the first values of content output features 204 for a specified period of time that the individual is reading the text content. For example, the computing device 202 may display text content according to the first values of content output features 204 for 5 minutes, 10 minutes, 20 minutes, 30 minutes, 45 minutes, 60 minutes, and so forth. In other situations, the computing device 202 may display text content according to the first values of content output features 204 for a specified amount of content. To illustrate, the computing device 202 may display text content according to the first values of content output features 204 for a duration elapsed to consume a specified number of pages, a specified number of characters, a specified number of words, a specified number of chapters, or a combination thereof.

At 206, the computing device 202 may determine a first reading speed of the text content displayed according to the first values of content output features 204 for an individual using the computing device 202. The reading speed may correspond to an amount of content that an individual read over a period of time. In illustrative examples, the reading speed may be expressed as a number of words per unit time, a number of characters per unit time, a number of pages per unit time, or combinations thereof, such as 200 words per minute. The reading speed may be determined based at least partly on an amount of time that elapsed while an individual read a specified amount of content. In other situations, the reading speed may be determined based at least partly on an amount of text content that the individual read during a specified period of time.

After determining the first reading speed, the computing device 202 may implement second values of content output features 208. The second values of content output features 208 may include a value $V1_{i+1}$ for font size, a value $V2_{i+1}$ for display brightness, a value $V3_{i+1}$ for font type, and a value $V4_{i+1}$ for font style. In particular implementations, the computing device 202 may display the text content using the values $V1_{i+1}$, $V2_{i+1}$, $V3_{i+1}$, and $V4_{i+1}$. At least one of the values $V1_{i+1}$, $V2_{i+1}$, $V3_{i+1}$, and $V4_{i+1}$ is different from a corresponding value included in the first values of content output features 204. For example, the value of $V1_{i+1}$ may be different from the value of $V1_i$. In another example, the value of $V1_{i+1}$ may be different from the value $V_{1i}$ and the value of $V2_{i+1}$ may be different from the value $V2_i$.

The computing device 202 may display text content according to the second values of content output features 208 for a specified period of time that the individual is reading the text content. In other situations, the computing device 202 may display text content according to the second values of content output features 208 for a specified amount of content. The amount of time that the text content is displayed according to the second values of content output features 208 may correspond with the amount of time that the text content was displayed according to the first values of content output features 204. In addition, the amount of text content displayed according to the second values of content output features 208 may correspond with the amount of content displayed according to the first values of content output features 204. At 210, the computing device 202 may determine a second reading speed of the text content displayed according to the second values of content output features 208 for an individual using the computing device 202. In some cases, the first reading speed and the second reading speed may be different.

After determining the second reading speed, the computing device 202 may implement third values of content output features 212. The third values of content output features 212 may include a value $V1_{i+2}$ for font size, a value $V2_{i+2}$ for display brightness, a value $V3_{i+2}$ for font type, and a value $V4_{i+2}$ for font style. In particular implementations, the computing device 202 may display the text content using the values $V1_{i+2}$, $V2_{i+2}$, $V3_{i+2}$, and $V4_{i+2}$. At least one of the values $V1_{i+2}$, $V2_{i+2}$, $V3_{i+2}$, and $V4_{i+2}$ is different from a corresponding value included in the first values of content output features 204 and/or different from a corresponding value included in the second values of content features 208. For example, the value of $V1_{i+2}$ may be different from the value of $V1_i$ and the value of $V_{i+1}$. In another example, the value of $V1_{i+2}$ may be different from the value and the value V and the value of $V2_{i+2}$ may be different from the value $V2_{i+1}$ and the value $V2_i$.

The computing device 202 may display text content according to the third values of content output features 212 for a specified period of time that the individual is reading the text content. In other situations, the computing device 202 may display text content according to the third values of content output features 212 for a specified amount of content. The amount of time that the text content is displayed according to the third values of content output features 212 may correspond with at least one of the amount of time that the text content was displayed according to the first values of content output features 204 or the amount of time that the text content was displayed according to the second values of content output features 208. In addition, the amount of text content displayed according to the third values of content output features 212 may correspond with at least one of the amount of content displayed according to the first values of content output features 204 or the amount of content displayed according to the second values of content output features 208. In addition, at 214, the computing device 202 may determine a third reading speed of the text content displayed according to the third values of content output features 212 for an individual using the computing device 202. In some cases, the third reading speed may be different from at least one of the first reading speed and the second reading speed.

After determining the third reading speed, the computing device 202 may, at 216, determine the values for content output features that are associated with a fastest reading speed. These values may correspond with the fourth values of content output features 218 of FIG. 2. The fourth values of content output features 218 may include a value $V1_o$ for font size, a value $V2_o$ for display brightness, a value $V3_o$ for font type, and a value $V4_o$ for font style. In particular implementations, the computing device 202 may display the text content using the values $V1_o$, $V2_o$, $V3_o$, and $V4_o$. In some cases, at least one of the values $V1_o$, $V2_o$, $V3_o$, and $V4_o$ may be the same as a corresponding value included in the first values of content output features 204, the second values of content output features 208, or the third values of content output features 212. For example, the computing device 202 may determine that the second reading speed is faster than the first reading speed and the third reading speed. Accordingly, the computing device 202 may determine that the value $V1_o$ is the same as the value $V1_{i+1}$, the value $V2_o$ is the same as the value $V2_{i+1}$, the value $V3_o$ is the same as the value $V3_{i+1}$, and the value $V4_o$ is the same as the value $V4_{i+1}$. In various implementations, fourth values of content output features 218 may be associated with certain conditions, such as conditions related to an individual using the computing device 202 (e.g., wearing glasses, wearing contact lenses, no vision correction devices), conditions related to an environment of the computing device 202 (e.g., amount of ambient light, time of day), or both. In this way, the fourth values of content output features 218 may be included in a content display profile, such as a content display profile 114 of FIG. 1, to be used in situations that correspond with the conditions in which the framework 200 was implemented. For example, the framework 200 may have been implemented under conditions where an individual using the computing device 202 was not wearing vision correction devices, the ambient light was moderate, and the time of day was afternoon. Consequently, in some instances, the fourth values of content output features 218 may be associated with a content display profile for the individual with conditions corresponding to the individual not wearing vision correction devices, the ambient light being moderate, and the time of day being the afternoon.

In some cases, a framework similar to the framework 200 may be used to refine the fourth values of content output features 218. For example, the values of one or more of the content output features may be incremented by a specified amount between the second values of content output features 208 and the first values of content output features 212 and between the third values of content output features 212 and the second values of content output features 208. To illustrate, the font size may be incremented by one point from $V1_i$ to $V1_{i+1}$ and from $V1_{i+1}$ to $V_{i+2}$. The fourth values of content output features 218 may be refined by modifying the values $V1_o$, $V2_o$, $V3_o$, and $V4_o$ by smaller or different amounts increments when possible. In particular, the values for font type, $V3_o$, and font style, $V4_o$, may not be characterized in a way that these values may be incremented by particular amounts. The values for font size, $V1_o$, and for display brightness, $V2_o$, may be incremented in smaller amounts to further optimize the values for these content output features. In an illustrative example, instead of incrementing the value of the font size by one point, the value of the font size may be incremented by 0.1 points. A framework similar to that of FIG. 2 may then be followed to determine reading speeds for text content having changes in font size of 0.1 points to determine if those changes provide any improvement to reading speed.

Although the illustrative example of FIG. 2 shows the determination of three reading speeds for three different values of content output features, the framework may be implemented to determine reading speeds for any number of values of content output features and any number of combinations of values of content output features.

Figure 3:
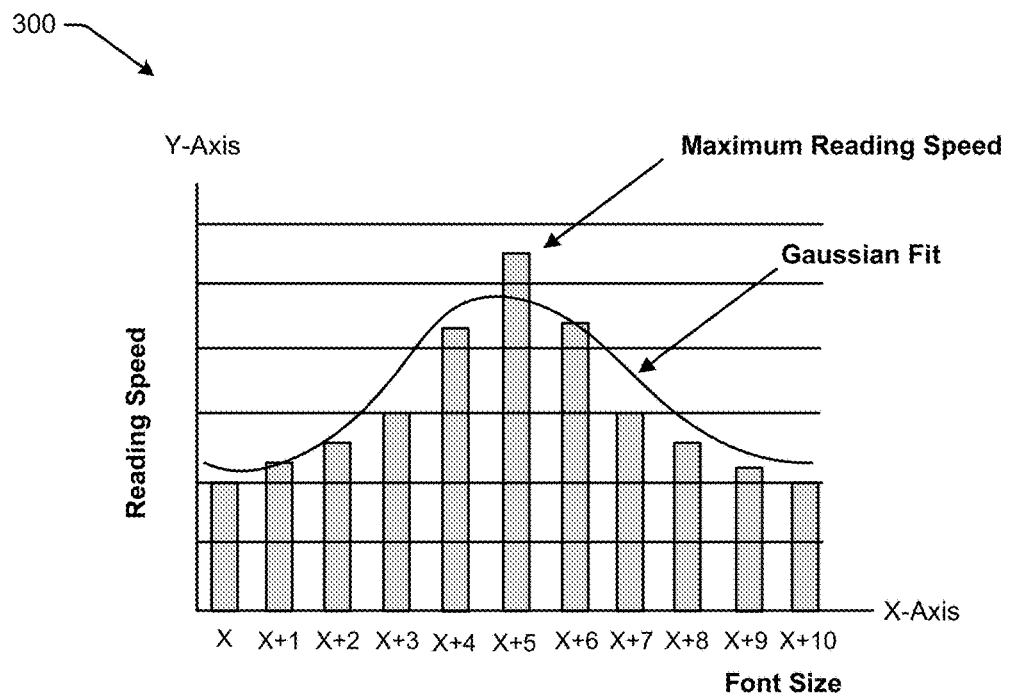
FIG. 3 illustrates an example graphic including results from implementing the framework of FIG. 2 to determine a font size for an individual that provides an increased consumption of text content.

FIG. 3 illustrates an example graphic 300 including results from implementing the framework 200 of FIG. 2 to determine a font size for an individual that provides an increased consumption of text content. In particular, the graphic 300 indicates values for reading speed along the Y-axis and values for font size along the X-axis. The values for font size increase along the X-axis and the values for reading speed increase along the Y-axis. The graphic 300 indicates that the maximum reading speed is associated with the font size X+5. In some implementations, since the font size X+5 corresponds to a maximum reading speed under a set of conditions, text content may be displayed using the font size X+5 by a computing device, such as the computing device 102 of FIG. 1 or the computing device 202 of FIG. 2. In the illustrative example of FIG. 3, a Gaussian fit is determined for the reading speeds. In various implementation, the Gaussian fit may be used to determine a value for font size of text content.

Figure 4:
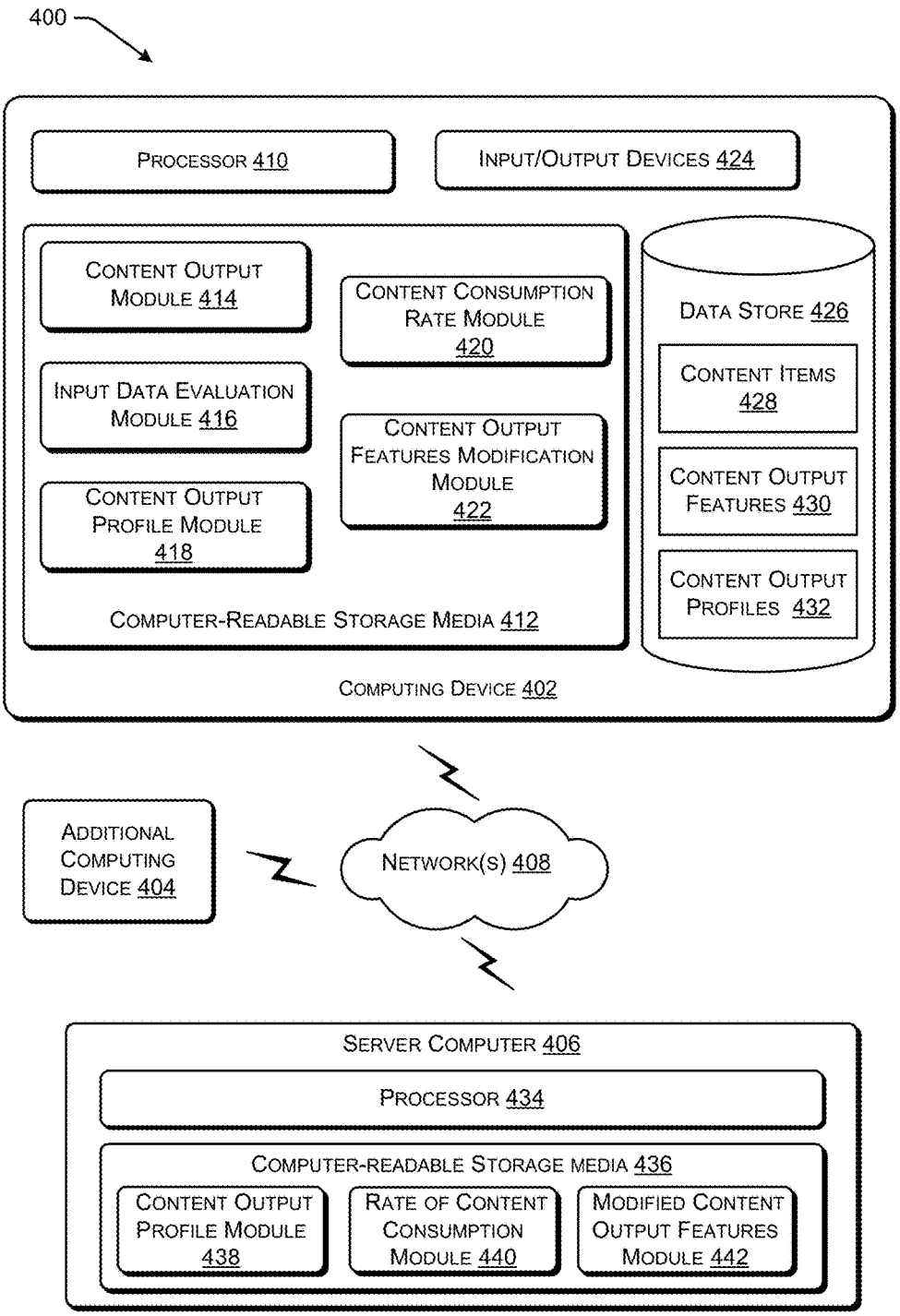
FIG. 4 is an example system to determine content output features that increase consumption of content by individuals.

FIG. 4 is an example system 400 to determine content output features that increase consumption of content by individuals. The system 400 may include a computing device 402 and an additional computing device 404. In some implementations, the additional computing device 404 may include one or more of the components of the computing device 402. In particular scenarios, the computing device 402 and the additional computing device 404 may be located in the same environment. The computing device 402 and the additional computing device 404 may include a laptop computing device, a tablet computing device, a mobile communications device (e.g., a mobile phone), a wearable computing device (e.g., watch, glasses, fitness tracking device), a desktop computing device, a gaming device, a television, combinations thereof, and the like. The system 400 may also include a server computer 406. The server computer 406 may be located in a location that is remote from the computing device 402 and the additional computing device 404.

The computing device 402, the additional computing device 404, and the server computer 406 may include one or network interfaces (not shown) to communicate with other computing devices via one or more networks 408. The one or more networks 408 may include one or more of the Internet, a cable network, a satellite network, a wide area wireless communication network, a wired local area network, a wireless local area network, or a public switched telephone network (PSTN).

The computing device 402 may include one or more processors, such as processor 410. The one or more processors 410 may include at least one hardware processor, such as a microprocessor. In some cases, the one or more processors 410 may include a central processing unit (CPU), a graphics processing unit (GPU), or both a CPU and GPU, or other processing units. Additionally, the one or more processors 410 may include a local memory that may store program modules, program data, and/or one or more operating systems.

In addition, the computing device 402 may include one or more computer-readable storage media, such as computer-readable storage media 412. The computer-readable storage media 412 may include volatile and nonvolatile memory and/or removable and non-removable media implemented in any type of technology for storage of information, such as computer-readable instructions, data structures, program modules, or other data. Such computer-readable storage media 412 may include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, removable storage media, or any other medium that can be used to store the desired information and that can be accessed by a computing device. Depending on the configuration of the computing device 402, the computer-readable storage media 412 may be a type of tangible computer-readable storage media and may be a non-transitory storage media.

The computer-readable storage media 412 may be used to store any number of functional components that are executable by the one or more processors 410. In many implementations, these functional components comprise instructions or programs that are executable by the one or more processors 412 and that, when executed, implement operational logic for performing the operations attributed to the computing device 402. Functional components of the computing device 402 that may be executed on the one or more processors 410 for implementing the various functions and features related to providing content according to content output values that increase content consumption, as described herein, include a content output module 414, an input data evaluation module 416 a content display profile module 418, a content consumption rate module 420, and a content output features modification module 422.

Additionally, the computing device 402 may include one or more input/output devices 424. The one or more input/output devices 424 may include a display device, keyboard, a remote controller, a mouse, a printer, audio input/output devices, a speaker, a microphone, a camera, and so forth The computing device 402 may also include, or is coupled to, a data store 426 that may include, but is not limited to, RAM, ROM, EEPROM, flash memory, one or more hard disks, solid state drives, optical memory (e.g. CD, DVD), or other non-transient memory technologies. The data store 426 may maintain information that is utilized by the computing device 402 to perform operations related to providing content according to values of content output features that increase content consumption. For example, the data store 426 may store content items 428. In addition, the data store 426 may store content output features 430 and the data store 426 may also store content output profiles 432.

The content items 428 may include electronic content that may be output by the computing device 402. For example, the content items 428 may include text content, audio content, image content, video content, or combinations thereof. In particular implementations, the content items 428 may include one or more forms of media, such as electronic books, music, pictures, videos, movies, television programs, audiobooks, podcasts, combinations thereof, and the like. In addition, the content output features 430 may include values for features that relate to the output of the content items 428. In some cases, the content output features 430 may indicate visual characteristics of content output by the computing device 402. In other situations, the content output features 430 may indicate audio characteristics of content output by the computing device 402. For example, the content output features 430 may include values for font features, such as font size, font type, and font style. The content output features 430 may also include information indicating layouts of text content. In addition, the content output features 430 may include a playback rate of audio content and/or a playback rate of video content. Further, the content output features 430 may include volume of audio content. In some, cases, the content output features 430 may include default values for content output features. Further, the content output features 430 may be associated with settings of the computing device 402 and/or values for content output features that are specified by the content items 428.

The content output profiles 432 may include values for content output features 430 that correspond to one or more conditions and/or one or more environments. In some cases, at least a portion of the content output profiles 432 may be associated with individuals. In this way, the output of content by the computing device 402 may be customized for individuals. In particular implementations, the content output profiles 432 may include values of content output features related to conditions associated with an individual, such as an individual wearing a vision correction device, such as glasses or contact lenses. In addition, the content output profiles 432 may include prescriptions for glasses, prescriptions for contact lenses, or both. Further, the content output profiles 432 may include values for content output features related to a time of day, an amount of ambient light in an environment, an amount of ambient noise in an environment, or combinations thereof.

The content output module 414 may include computer-readable instructions that when executed by the processor 410 to output content associated with the content items 428. The content output module 414 may output the content based on values of the content output features 430, values of the content output features included in the content output profiles 432, or both. In a particular example, the content output module 414 may provide text content having one or more font sizes, one or more font types, one or more font styles, a particular page layout, or combinations thereof. In another example, the content output module 414 may provide audio content at a particular volume and playback rate. In an additional example, the content output module 414 may provide video content at a specified playback rate.

In some cases, the content output module 414 may provide content items according to one or more content output profiles 432. For example, the content output module 414 may identify a content output profile 432 to be utilized to provide a content item and the content output module 414 may set values of content output features to correspond with values included in the content output profile 432. The content output module 414 may then provide a content item 428 via the computing device 402 according to the values of the content output features included in the content output profile 432.

The input data evaluation module 416 may include computer-readable instructions executable by the processor 410 to determine whether or not one or more conditions have been satisfied to cause a modification to values of content output features. For example, the input data evaluation module 416 may determine that a reading speed of an individual has decreased. In addition, the input data evaluation module 416 may determine that conditions in an environment that includes the computing device 402 may have changed based on sensor data. In some cases, the sensor data may include one or more images. The images may be obtained from a camera of the computing device 402, from another computing device, such as the additional computing device 404, or both. Further, the input data evaluation module 416 may determine that conditions associated with an individual may have changed, such as determining that an individual has removed their glasses or removed their contact lenses.

In particular implementations, the input data evaluation module 416 may analyze input data to identify one or more conditions indicating that values of content output features are to be modified. In some scenarios, the input data evaluation module 416 may analyze input data with respect to one or more thresholds to determine that at least one value of one or more content output features are to be changed. For example, the input data evaluation module 416 may determine that a reading speed of an individual has decreased below a threshold level and/or that a reading speed of the individual has decreased by a threshold amount. In these situations, the input data evaluation module 416 may determine that values of one or more output features are to be modified with regard to content provided to an individual.

The content output profile module 418 may include computer-readable instructions that are executable by the processor 410 to identify a content output profile 432 to apply to particular conditions determined by the input data evaluation module 416. In some implementations, the content output profile module 418 may obtain one or more conditions related to an individual and/or an environment of an individual determined by the input data evaluation module 416. Based at least partly on the one or more conditions, the content output module 414 may identify a content output profile 432 that corresponds with the one or more conditions. The content output module 414 may then utilize values of content output features included in the content output profile 432 to cause the computing device 402 and/or the additional computing device 404 to output one or more of the content items 428. In various implementations, a content output profile 432 may include a range of values for one or more conditions, and the content output profile module 418 may determine that one or more conditions determined by the input data evaluation module 416 are included in the range of values for the one or more conditions of the content output profile 432. To illustrate, the content output profile module 418 may determine that an amount of ambient light associated with an environment of the computing device 402 is included in a range of amounts of ambient light associated with a particular content output profile 432. In this situation, the content output profile module 418 may obtain values of one or more content output features included in the particular content output profile 432 to be used by the content output module 414 in outputting one or more content items 428.

In other implementations, the content output profile module 418 may determine a similarity between one or more conditions identified by the input data evaluation module 416 and one or more conditions of a content output profile 432. Based at least partly on a similarity of one or more conditions of an individual and/or an environment of the individual being within a threshold amount of one or more corresponding conditions of a content output profile, the content output profile module 418 may determine that the content output profile 432 is to be applied by the content output module 414 in providing one or more content items 428. In an illustrative example, the content output profile module 418 may determine that an image of an individual using the computing device 402 has a similarity with an image associated with a particular content output profile 432 related to an individual wearing glasses. In this example, the content output profile module 418 may determine that the values of one or more content output features of the particular content output profile 432 are to be used to provide one or more content items 428.

Additionally, the content output profile module 418 may generate profiles by determining one or more conditions and associating values of content output features 436 to the one or more conditions. In some implementations, the content output profile module 418 may associate one or more conditions of an individual and/or one or more conditions of an environment of the computing device 402 with one or more values of content output features and produce a content output profile 432 corresponding to the one or more conditions of the individual and/or the one or more conditions of the environment of the computing device 402 with the corresponding one or more values of the content output features. For example, the content output profile module 418 may produce a content output profile 432 indicating one or more font sizes or a range of font sizes that are associated with an optimized reading speed of an individual when the individual is wearing glasses. In another example, the content output profile module 418 may produce an additional content output profile 432 indicating one or font sizes, a range of font sizes, one or more settings for display brightness, a range of values for display brightness, or combinations thereof, when the computing device 402 is located in an environment having a particular amount of ambient light.

The content consumption rate module 420 may determine a rate of consumption of content by an individual. The content consumption rate module 420 may utilize sensor data to determine a number of words read by an individual over a period of time. In some cases, the content consumption module 420 may determine a number of page turns or section changes within a period of time that indicate a number of words read by an individual. The content consumption rate module 420 may implement a procedure to determine conditions that are associated with an increased rate of content consumption by an individual. The procedure may include measuring an amount of content consumed by an individual over time under a number of sets of conditions. For example, the content consumption rate module 420 may produce one or more user interfaces including text content displayed with a particular font size and font type and determine a rate at which an individual reads the text content. The content consumption rate module 420 may then increment a value of the font size and determine the rate at which the individual reads text content at the various increments. In some cases, the content consumption rate module 420 may determine a threshold lowest value for a feature, such as a smallest font size that an individual is able to read and then begin to increment the font size to identify one or more font sizes associated with one or more amounts of consumption of text content.

The content output features modification module 422 may modify values of content output features to increase the amount of consumption of content by an individual. In some instances, the content output features modification module 422 may modify values of content output features to correspond with different values of content output features that are associated with an increased consumption of content by an individual. For example, the content output features modification module 422 may obtain information from the content rate consumption module 420 indicating that an individual may consume an increased amount of content when one or more content output features have different values from a current value, different values from a default value, or different values from an initial value. The content output features modification module 420 may then modify the values of the content output features to correspond with the values associated with the increased rate of content consumption.

The server computer 406 includes a processor 434 and a computer readable storage media 436. The processor 434 may include a hardware-processing unit, such as a central processing unit, a graphics processing unit, or both. In an implementation, the computer-readable storage media 436 may include volatile and nonvolatile memory and/or removable and non-removable media implemented in any type of technology for storage of information, such as computer-readable instructions, data structures, program modules, or other data. Such computer-readable storage media 436 may include, but is not limited to, RAM, ROM, EEPROM, flash memory or other memory technology, CD-ROM, digital versatile disks (DVD) or other optical storage, solid state storage, magnetic disk storage, removable storage media, or any other medium that may be used to store the desired information and that can be accessed by the server computer 406. Depending on the configuration of the server computer 406, the computer-readable storage media 436 may be a type of tangible computer-readable storage media and may be a non-transitory storage media.

In some implementations, the server computer 406 may perform one or more of the operations described with respect to the computing device 402. For example, the computer readable storage media 436 may include a content output profile module 438 that includes computer readable instructions that are executable by the processor 434 to generate a content output profile that includes values of content output features for certain conditions and to identify values of content output features that may be used to output content. The content output profile module 438 may then generate one or more content output profiles to be stored by the computing device 402 that indicate values for content output features that are associated with various conditions. Additionally, the computer readable storage media 436 may include a rate of content consumption module 440 that includes computer readable instructions that are executable by the processor 434 to obtain data from the computing device 402 and determine a rate of consumption of content by an individual. In some cases, the rate of content consumption module 440 may obtain, from the computing device 402, images of eyes of an individual and information indicating content being viewed by the individual and determine an amount of the content viewed by the individual over a period of time. Further, the computer readable storage media 436 may include a modified content output features module 442 having computer readable instructions that are executable by the processor 434 to determine modified values of content output features that increase content consumption by an individual.

Figure 5:
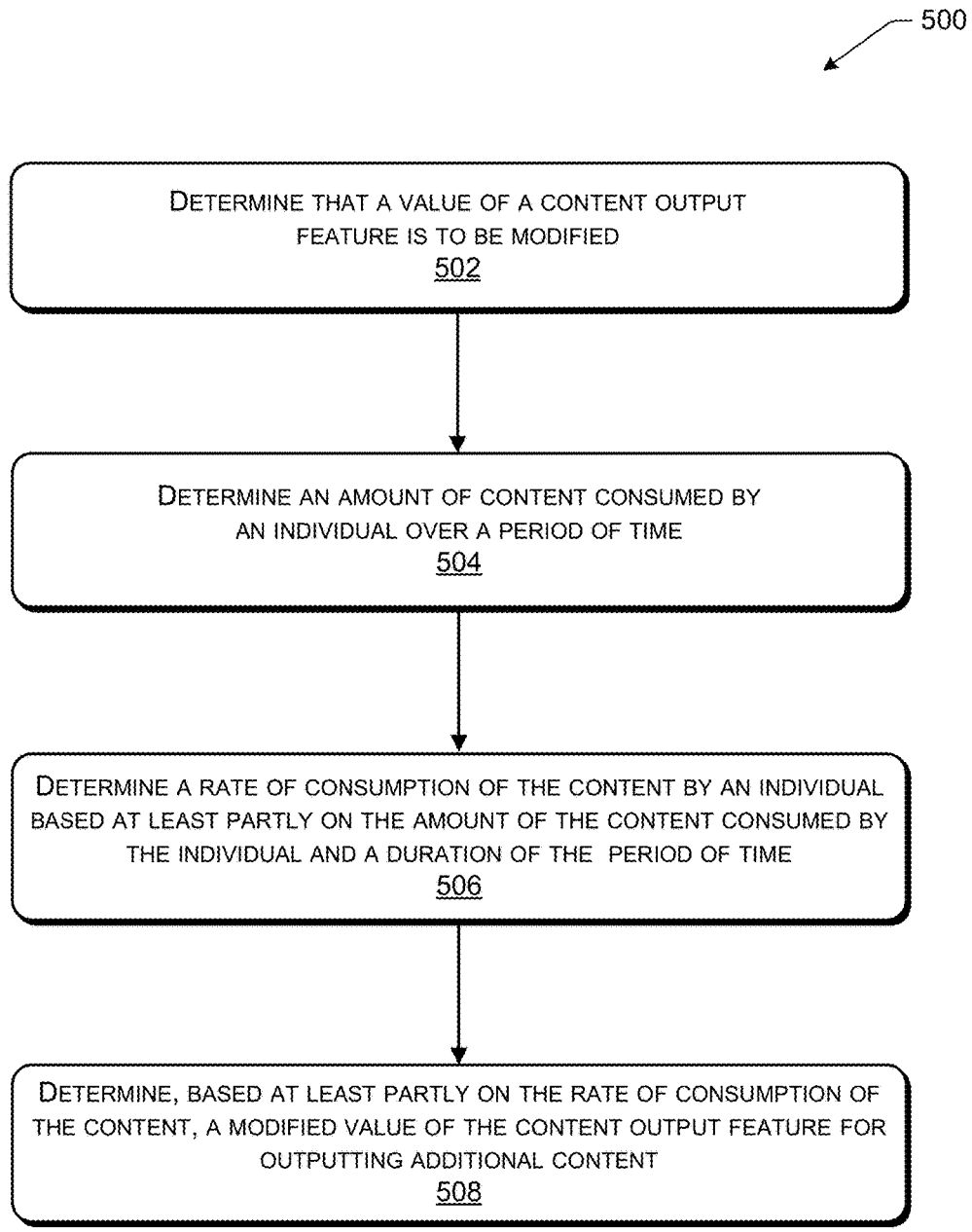
FIG. 5 is flow diagram illustrating an example process to identify content output features that increase consumption of content by individuals.
Figure 6:
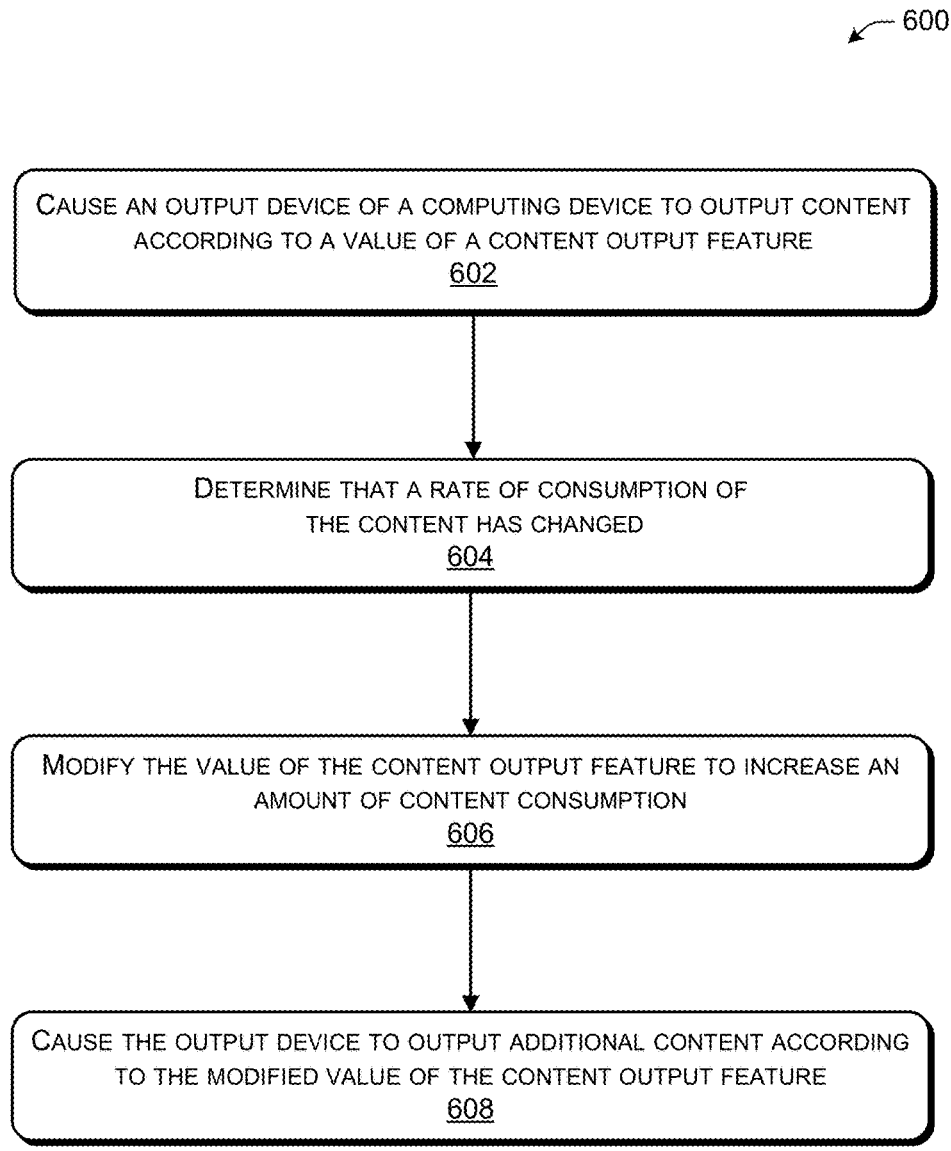
FIG. 6 is a flow diagram illustrating an example process to modify content output features based on input obtained by a computing device.
Figure 7:
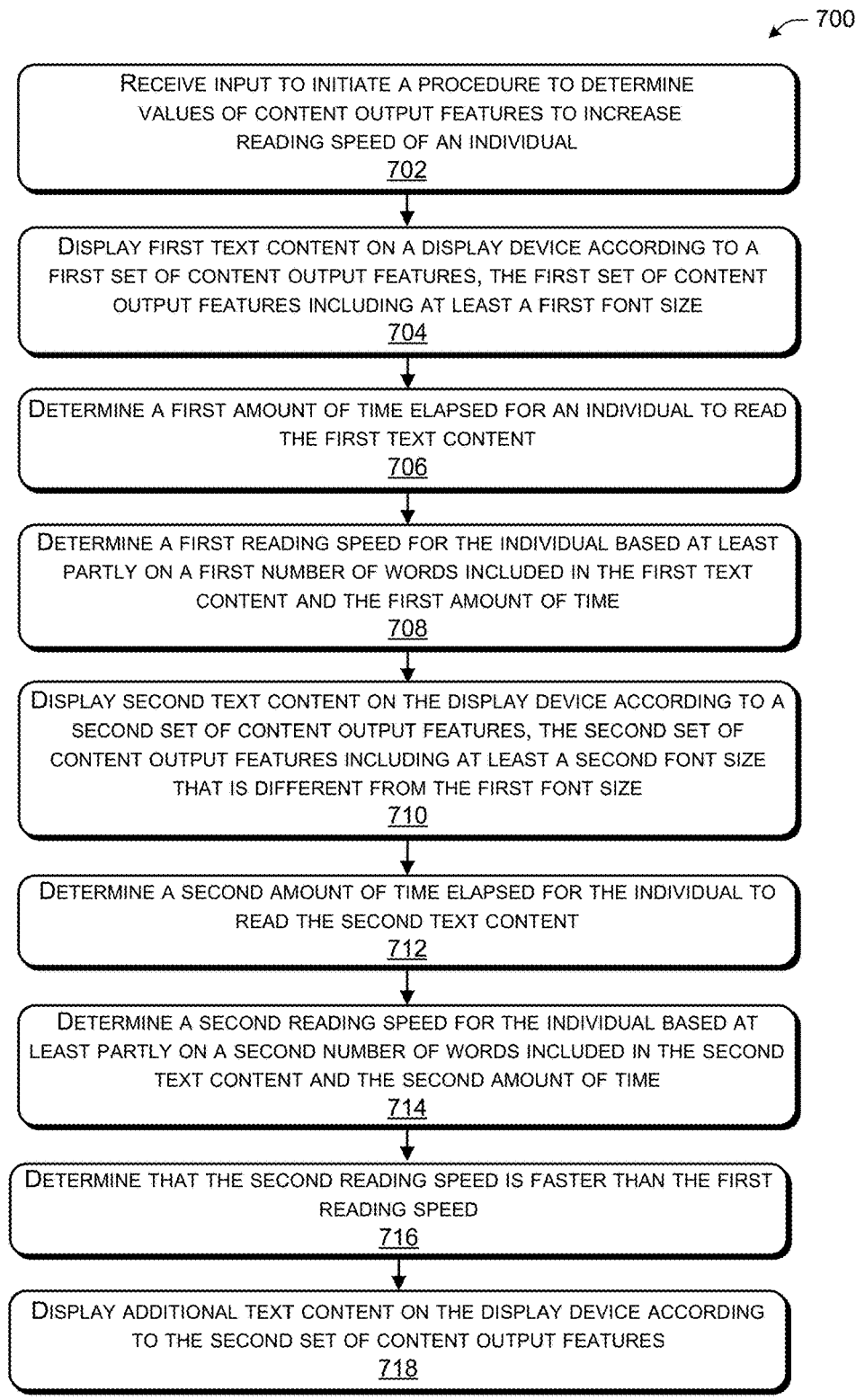
FIG. 7 is a flow diagram illustrating an example process to modify content output features for text content to increase reading speed of individuals.

FIGS. 5-7 illustrate example processes of determining content output features to increase content consumption. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 is flow diagram illustrating an example process 500 to identify content output features that increase consumption of content by individuals. At 502, the process 500 includes determining that a value of a content output feature is to be modified with respect to content output by a computing device. In some cases, the value of the content output feature may be modified due to conditions in an environment of a computing device changing, such as an amount of ambient light changing or an amount of ambient noise changing. In other situations, the values of a content output feature may change because content consumption by an individual has decreased. Further, the values of a content output feature may be modified to account for changes associated with an individual, such as vision changes of the individual.

At 504, the process 500 includes determining an amount of content consumed by an individual over a period of time. The amount of content consumed by an individual over a period of time may be determined based on gaze tracking techniques that utilize images of eyes of an individual to determine a number of words viewed by the individual. The amount of content consumed by an individual may also relate to a number of pages viewed by an individual and a number of words and/or characters included on each page. At 506, the process 500 includes determining a rate of consumption of the content by an individual based at least partly on the amount of the content consumed by the individual and a duration of the period of time. That is, the operation 506 utilizes the amount of content consumed by an individual and determines a rate of content consumption based on an amount of time taken to consume the amount of content.

At 508, the process 500 includes determining, based at least partly on the rate of consumption of the content, a modified value of the content output feature for outputting additional content. In particular, a value that increases the consumption of content may be determined and applied to the output of content to the individual in order to optimize the amount of content consumed by the individual. In situations where the content being consumed by the individual includes audio content, the modified value of the content output feature may correspond to at least one of a volume used to provide the content via the computing device or a rate of playback of the audio content. Additionally, when the content being consumed by the individual includes video content, the modified value of the content output feature may correspond with a rate of playback of the video content. Further, when the content being consumed by the individual includes text content, the modified value of the content output feature may relate to at least one of a font size, a font type, a font style, or a layout of the text content. The layout of the text content may include margins, line spacing, character spacing, alignment, or a combination thereof. In still other scenarios, the content output feature being modified may be related to at least one setting of a display device of the computing device and the modified value of the content output feature may correspond with at least one of brightness of the display device, contrast of the display device, tone of the display device, color of the display device, or hue of the display device.

FIG. 6 is a flow diagram illustrating an example process 600 to modify content output features based on input obtained by a computing device. At 602, the process 600 includes causing the output device to output content according to a value of a content output feature. For example, text content, image content, and/or video content may be displayed via a display device of a computing device. In another example, audio content may be provided via a speaker of a computing device. In the case of text content, the text content may be displayed according to values for a font size, a font style, a font type, or a combination thereof.

At 604, the process 600 includes determining that a rate of consumption of the content has changed. For example, a computing device may determine that a rate of consumption of content by an individual may have decreased. To illustrate, the computing device may determine that a number of words read by an individual decreased by a threshold amount over a period of time. Accordingly, at 606, the process 600 may include modifying the value of the content output feature to increase an amount of content consumption. Modifying the value of the content output feature may include producing a modified value of the content output feature. In some cases, the value of the content output feature may be modified based on a number of factors, such as a distance between the eyes of an individual and the display of the computing device, an amount of ambient light in an environment, a vision prescription of an individual, or combinations thereof. The modified value of the content output feature may cause the consumption of content by the individual to increase. Additionally, at 608, the process 600 includes causing the output device to output additional content according to the modified value of the content output feature. In this way, the manner in which the content is presented to the individual via the display device is optimized such that an increased amount of content is consumed by the individual.

In some cases, the modified value for the content output feature may be determined by generating a Gaussian distribution for the rate of content consumption over different conditions. For example, a rate of content consumption may be determined for text content displayed using different fonts. The maximum of the Gaussian distribution may indicate an optimized font value that increases consumption of content by the individual.

FIG. 7 is a flow diagram illustrating an example process 700 to modify content output features for text content to increase reading speed of individuals. At 702, the process 700 includes receiving input to initiate a procedure to determine values of content output features to increase reading speed of an individual. For example, an individual may provide input to initiate a process to determine optimized values for content output features in order to increase consumption of content by the individual. To illustrate, an individual may launch a tool or an application via one or more user interfaces that starts a process to determine optimized values for content output features. In some implementations, the tool or application may obtain input from an individual indicating a first threshold font size and a second threshold font size, such as a minimum font size and a maximum font size, to be used in determining values for content output features. In some cases, a procedure to increase reading speed of an individual may commence by displaying content at the minimum font size and measuring the reading speed of the individual at increments of the font size starting at the minimum font size until a maximum font size is reached. In other cases, a procedure to increase reading speed of an individual may commence by displaying content at the maximum font size and measuring the reading speed of the individual at increments of the font size starting at the maximum font size until a minimum font size is reached.

At 704, the process 700 includes displaying first text content on the display device according to a first set of content output features. The text content may be displayed within one or more user interfaces produced by a computing device. In some cases, the text content may be associated with an electronic book that is divided into a number of sections. Each section of the electronic book may include a number of characters and/or a number of words. Different sections of the electronic book may be displayed based at least partly on input received by the computing device. The input may indicate a page turn input to move from one section of an electronic book to a subsequent section of an electronic book. The input may also indicate navigation across multiple sections of the electronic book.

The first set of content output features may include at least a first font size, and at 706, the process 700 includes determining a first amount of time elapsed for an individual to read the first text content. At 708, the process 700 may then include determining a first reading speed for the individual based at least partly on a first number of words included in the first text content and the first amount of time. In a particular example, the number of words consumed by an individual may depend on a number of sections of an electronic book viewed by the individual during the period of time and the number of words included in each section. In other implementations, the reading speed of an individual may be determined based at least partly on images of eyes of the individual and determining the portions of content viewed by the individual based at least partly on the images.

At 710, the process 700 includes displaying second text content on the display device according to a second set of content output features. The second set of content output features may include at least a second font size that is different from the first font size. Additionally, at 712, the process 700 may include determining a second amount of time elapsed for the individual to read the second text content. Thus, at 714, the process 700 may include determining a second reading speed for the individual based at least partly on a second number of words included in the second text content and the second amount of time. Further, at 716, the process 700 may include determining that the second reading speed is faster than the first reading speed. At 718, the process 700 may include displaying additional text content on the display device according to the second set of content output features. In particular, by determining values for content output features at which an individual consumes more content, a computing device may modify the values for content output features when providing new content in order to increase the consumption of content by individuals.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
a display device;
one or more processors;
memory; and
one or more computer-executable instructions stored in the memory and executable by the one or more processors to perform operations comprising:
receiving input to initiate a procedure to determine values of content output features to increase a reading speed of an individual;
displaying first text content on the display device according to a first set of content output features, the first set of content output features including at least a first font size;
determining a first amount of time elapsed for the individual to read the first text content;
determining a first reading speed for the individual based at least partly on a first number of words included in the first text content and the first amount of time;
displaying second text content on the display device according to a second set of content output features, the second set of content output features including at least a second font size that is different from the first font size;
determining a second amount of time elapsed for the individual to read the second text content;
determining a second reading speed for the individual based at least partly on a second number of words included in the second text content and the second amount of time;
determining that the second reading speed is faster than the first reading speed; and
displaying additional text content on the display device according to the second set of content output features.

2. The computing device as recited in claim 1, wherein the first font size differs from the second font size by a first amount and the operations further comprise:
displaying third text content on the display device according to a third set of content output features, the third set of content output features including at least a third font size that is different from the second font size and the third font size differs from the second font size by a second amount that is less than the first amount;
determining a third amount of time elapsed for the individual to read the third text content;
determining a third reading speed for the individual based at least partly on a third number of words of the third text content and the third amount of time;
determining that the third reading speed is greater than the second reading speed; and
displaying fourth text content on the display device according to the third set of content output features.

3. The computing device as recited in claim 1, wherein:
the first text content includes a number of first sections of an electronic book;
the second text content includes a number of second sections of the electronic book, the number of second sections being greater than the number of first sections; and
the operations further comprise:
displaying the number of first sections during the first amount of time, wherein the first reading speed is based at least partly on the number of first sections being displayed during the first amount of time; and
displaying the number of second sections during the second amount of time, wherein the second reading speed is based at least partly on the number of second sections being displayed during the second amount of time.

4. The computing device as recited in claim 1, further comprising at least one camera, and the operations further comprise:
capturing, by the at least one camera, one or more first images of at least one eye of the individual during the first amount of time;
identifying first portions of the first content viewed by the individual during the first amount of time based at least partly on the one or more first images;

capturing, by the at least one camera, one or more second images of the at least one eye of the individual during the second amount of time; and identifying second portions of the second content viewed by the individual during the second amount of time based at least partly on the one or more second images.

5. The computing device as recited in claim 4, the operations further comprise:

obtaining, by the at least one camera, one or more additional images of the individual and of an environment including the individual and the computing device;

determining, based at least partly on a first portion of the one or more additional images, an amount of ambient light in the environment;

determining, based at least partly on a second portion of the one or more additional images, that the individual is wearing at least one vision correction device; and determining that a content output feature is to be modified based at least partly on at least one of the amount of ambient light in the environment or determining that the individual is wearing the at least one vision correction device.

6. A method comprising:

determining, by one or more computing devices including at least one processor and memory, that a first value of a content output feature is to be modified with respect to content displayed by a display device, the content output feature corresponding to at least one visual characteristic of the content;

determining, by the one or more computing devices, that a first amount of a first portion of the content that is included in a first user interface displayed by the display device according to the first value is consumed by an individual over a first period of time;

determining, by the one or more computing devices, a first rate of consumption of the first portion of the content by the individual based at least partly on the first amount of the first portion of the content consumed by the individual and a first duration of the first period of time;

determining, by the one or more computing devices, that a second amount of a second portion of the content that is included in a second user interface displayed by the display device according to a second value of the content output feature is consumed by the individual over a second period of time;

determining, by the one or more computing devices, a second rate of consumption of the second portion of the content by the individual based at least partly on the second amount of the second portion of the content consumed by the individual and a second duration of the second period of time;

determining, by the one or more computing devices, that the second rate of consumption is greater than the first rate of consumption; and determining, by the one or more computing devices, that additional content is to be displayed by the display device according to the second value of the content output feature.

7. The method as recited in claim 6, wherein determining that the first value of the content output feature is to be modified includes obtaining input to determine values of content output features to increase consumption of the content.

8. The method as recited in claim 6, wherein determining that the first value of the content output feature is to be modified includes determining a change in an amount of the content consumed by the individual.

9. The method as recited in claim 6, wherein determining that the first value of the content output feature is to be modified includes obtaining data from one or more sensors indicating a change in an environment including the individual.

10. The method as recited in claim 6, further comprising:

determining that an additional value of an additional content output feature is to be modified;

determining a condition in an environment that includes the individual; and identifying a content output profile from among a plurality of content output profiles based at least partly on the content output profile corresponding with the condition in the environment.

11. The method as recited in claim 10, further comprising:

determining that the content output profile includes the additional content output feature;

identifying a different value of the additional content output feature included in the content output profile; and modifying the additional value of the additional content output feature to correspond with the different value of the content output feature included in the content output profile.

12. The method as recited in claim 6, wherein:

the content includes audio content; and the method further comprises:

determining that a first value of an additional content output feature is to be modified with respect to the audio content, the additional content output feature corresponding to at least one audio characteristic of the audio content; and modifying at least one of a volume used to provide the audio content via the computing device or a rate of playback of the audio content according to at least a second value of the additional content output feature.

13. The method as recited in claim 6, wherein:

the content includes video content; and the method further comprises modifying a rate of playback of the video content according to at least the second value of the content output feature.

14. The method as recited in claim 6, wherein:

the content includes text content; and the method further comprises modifying at least one of a font size, a font type, a font style, or a layout of the text content, the layout of the text content including margins, line spacing, character spacing, alignment, or combination thereof, according to at least the second value of the content output feature.

15. The method as recited in claim 6, wherein:

the content output feature is related to at least one setting of the display device; and the method further comprising modifying at least one of brightness of the display device, contrast of the display device, tone of the display device, color of the display device, or hue of the display device according to at least the second value of the content output feature.

16. A computing device comprising:

a display device;

one or more processors;

memory; and one or more computer-executable instructions stored in the memory and executable by the one or more processors to perform operations comprising:

determining one or more first values of one or more content output features that are associated with a first rate of content consumption;

determining one or more second values of the one or more content output features that are associated with a second rate of content consumption that is greater than the first rate of content consumption;

displaying text of an electronic book in a user interface according to a value of a content output feature included in the one or more content output features;

determining that a rate of consumption of the electronic book has changed;

identifying a modified value of the content output feature from the one or more second values of the one or more content output features; and displaying additional text of the electronic book in an additional user interface according to the modified value of the content output feature.

17. The computing device as recited in claim 16, wherein:

the value of the content output feature includes a first font size and the modified value of the content output feature includes a second font size; and the operations further comprise:

obtaining input indicating a first threshold font size and a second threshold font size, wherein the first font size and the second font size are larger than the first threshold font size and are smaller than the second threshold font size;

determining a first reading speed of an individual for first text content displayed according to the first font size;

determining a second reading speed of the individual for second text content displayed according to the second font size;

determining a third reading speed of the individual for third text content displayed according to the first threshold font size, wherein the third reading speed is less than the first reading speed and the second reading speed; and determining a fourth reading speed of the individual for fourth text content displayed according to the second threshold font size, wherein the fourth reading speed is less than the first reading speed and the second reading speed.

18. The computing device as recited in claim 17, the operations further comprise:

producing a Gaussian distribution indicating reading speed of the individual for a plurality of font sizes, the plurality of font sizes including at least the first font size, the second font size, the first threshold font size, and the second threshold font size;

determining a font size corresponding to a maximum of the Gaussian distribution; and displaying additional text content according to at least the font size corresponding to the maximum of the Gaussian distribution.

19. The computing device as recited in claim 16, the operations further comprise:

obtaining a content output profile from a remote server; and determining the modified value of the content output feature based at least partly on the content output profile.

20. The computing device as recited in claim 16, wherein the operations further comprise:

determining a distance between the display device and an eye of an individual; and modifying the value of the content output feature based at least partly on the distance between the display device of the computing device and the eye of the individual.

* * * * *